Feb. 6, 1934.  A. GORHAN  1,946,020
APPARATUS FOR PRODUCING ANHYDROUS ETHYL ALCOHOL
DIRECTLY FROM MASHES AND THE LIKE
Filed June 14, 1932
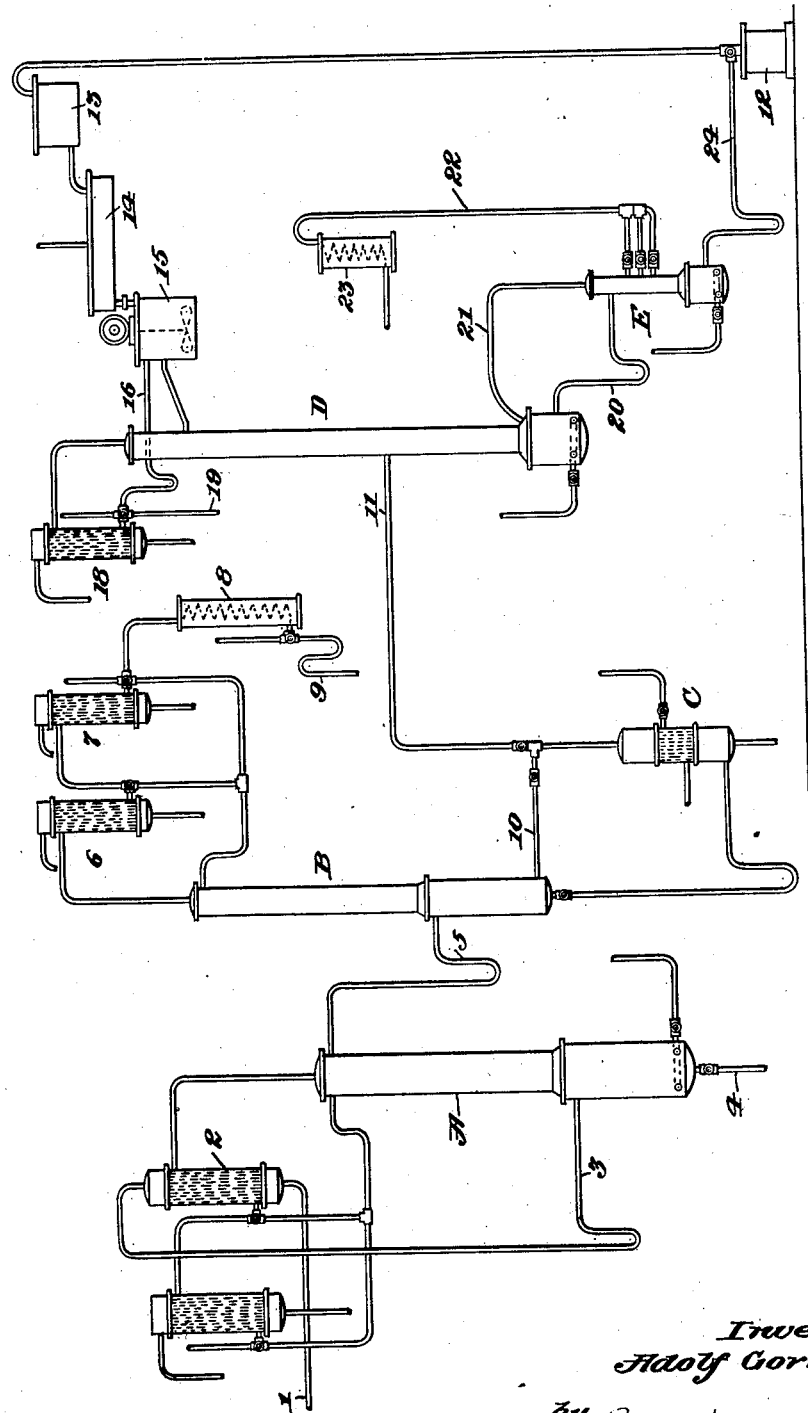
Inventor:
Adolf Gorhan,
by C. F. Wenderoth
Att'y.

Patented Feb. 6, 1934

1,946,020

UNITED STATES PATENT OFFICE 1,946,020

APPARATUS FOR PRODUCING ANHYDROUS ETHYL ALCOHOL DIRECTLY FROM MASHES AND THE LIKE

Adolf Gorhan, Liesing, near Vienna, Austria, assignor to Deutsche Gold- und Silber Scheideanstalt vormals Roessler, Weissfrauen, Frankfort-on-the-Main, Germany Application June 14, 1932, Serial No. 617,161, and in Germany October 2, 1931

2 Claims. (Cl. 202—154)

This invention relates to the continuous production of anhydrous ethyl alcohol directly from mashes and the like.

In the specification of application for patent Serial No. 617,473, filed June 15th, 1932, there has been described a process that enables the high boiling point impurities—especially the fusel oils—to be removed from raw spirit by treating this raw spirit with suitable dehydrating agents, especially salts or salt solutions, such as solutions of the fatty acid salts of the alkalis and earth alkalis so that the ethyl alcohol content in the vapor phase is increased to such an extent that the ethyl alcohol distils off poor in water whilst the fusel oils remain behind. As an especially suitable salt for this purpose, there was recommended in the specification of the aforesaid application a mixture of about 70 per cent. of potassium acetate and about 30 per cent. of sodium acetate. It was also recommended in the specification of the aforesaid application, for the purpose of more effective dehydration, that the vapors of the alcohol to be purified pass through the salt solutions or suspensions or are washed therewith in suitable devices, and finally it was recommended to enhance this action of the salt solutions or suspensions on the alcohol vapors by reducing the salts to the anhydrous condition and employing absolute alcohol as solvent or suspension agent for them so that, instead of an alcohol poor in water, anhydrous alcohol is distilled off free from high boiling point impurities, especially fusel oils.

It has now been found that the process described in the specification of the aforesaid application can be applied, with great technical and economic success, to the obtaining of raw spirit from mashes, worts, spent sulphite liquors and the like, and that for the carrying out of the process it is sufficient to employ a comparatively simple arrangement of apparatus, which works with very favorable heat economy, owing to the fact that the spirit is not, as hitherto usual, brought to high concentrations—e. g. to 94% by weight—by distillation requiring a great deal of steam, but is subjected in the distillation apparatus merely to a preliminary concentration to relatively low strength requiring the expenditure of only moderate quantities of heat, whilst the main work of concentration is transferred to the dehydrating apparatus. Further, the heat that must be used up in the de-alcoholization and in the first concentration of the raw spirit is again utilized to a very large extent.

Processes are already known that produce absolute alcohol directly from mashes in one operation. Inter alia, such a method of operation is proposed in French Patent No. 644,202, a saving of steam being obtained in that method mainly in using up the heat contained in the vinasse or in the de-alcoholized spent liquors. However, in the case of this known process, there is no saving in the proper sense of obviating the consumption of heat, but merely a using up of existing heat. Such a utilization of the heat contained in the vinasse or in the de-alcoholized spent liquors is a saving only in the sense that it represents economy if this heat would otherwise be allowed to dissipate uselessly. This is, however, not the case in works with modern equipment. The heat contained in the vinasses or de-alcoholized spent liquors is of use in further treatment, either in the inspissation of the vinasse or in its working up to crude potash; in other cases, this heat is used up for the production of hot water or for room heating. In contradistinction to the known processes, the present invention does not use up existing quantities of heat, which could be quite as valuable in other directions, but involves actually a minimum consumption of heat, owing to the fact that the alcohol is not, as hitherto usual, concentrated to very high degrees of strength in the rectification column, but is concentrated by expenditure of substantially smaller consumption of steam to only moderate degrees of strength, whilst the main work in the dehydration of the alcohol is performed in the dehydrating apparatus in which the alcohol becomes absolute and the dehydration can be carried out with a substantially more favorable heat effect.

In the process of the French Patent No. 644,202 the statement of prior art concerning the amount of steam required for the rectification followed by dehydration of the alcohol when using the usual old methods of concentration by distillation and azeotropic dehydration is given as 875 kgs. per hectolitre of absolute alcohol and the amount required for distillation or rectification combined with dehydration into a single operation with suitable apparatus is given as 700 kgs. per hectolitre.

According to the process described in the French patent it should be possible to manage with 350 kgs. of steam. As already stated above, this saving is essentially to be attributed to the very large extent of utilization of the vinasse heat. In contradistinction to this, the present invention enables one to manage with a consumption of steam of less than 350 kgs. notwithstanding the conservation of the valuable vinasse heat. If the local conditions render it possible, the vinasse heat can be wholly or partially used for covering the heat requirement. The said consumption of heat of less than 350 kgs. is, accordingly, then still further reduced.

The arrangement of apparatus according to the present invention for carrying out the process of the application for patent Serial No. 617,473, filed June 15, 1932 will now be described with reference to the accompanying drawing.

The mash arrives through the pipe 1 and, for the purpose of being preheated, first flows through the condenser 2. After being preheated it enters at 3 the bottom portion of the distilling and concentrating column A. The complete dealcoholization of the mash takes place in the bottom part of the column, so that the vinasse flows away through the pipe 4 free from volatile constituents. In the upper part of the column A the concentration of the vapor mixture takes place to such an extent that an alcohol of about 60–90% strength is obtained which, in addition to carrying off the low boiling point head products such as acetaldehyde, ethyl acetate and the like, carries with it all the fusel oils as impurities. This product is drawn off in the fluid condition through the pipe 5 and is passed into the head products column B having the condensers 6 and 7. In this column the low boiling head products, such as acetaldehyde, and low boiling esters, such as methyl and ethyl acetate, are separated off as thoroughly as possible. On the other hand, the fusel oils, as well as the greater part of the methyl alcohol that occurs, for example, in the treatment of spent sulphite liquors, remain in the alcohol. The head products are condensed in the condenser 8 and leave the apparatus through the pipe 9. The heating of the column B is effected by means of the heating device C.

In order to complete the removal of the head products—thus, for example, to destroy the last traces of esters or to remove traces of acetaldehyde—which could subsequently have a deleterious effect, by acidification, on the quality of the absolute alcohol obtained, the boiling in the heating device C may be combined with a chemical treatment with lye. The whole of the alcohol flows through this heating device C or stays therein for a length of time corresponding to the capacity of the latter. A part of the alcohol vapors evolved therein heats the column B through the pipe 10; the main quantity corresponding to the throughput passes through pipe 11 into the dehydrating apparatus D.

The alcohol entering the dehydrating apparatus or column D in the condition of vapor is washed with a solution or suspension of suitable dehydrating salts in absolute alcohol. To this end, the aqueous salt solution resulting from the dehydrating process is forced by a liquid-raising pump 12 to a raised reservoir 13, is completely dehydrated in a pan 14 and is run in molten condition into a stirring vessel 15 in which it is dissolved in absolute alcohol which is branched off through the pipe 16 from the end product of the column D. This alcoholic salt solution enters the top of the column D through the pipe 17. From the top of the column D the vapors of the anhydrous alcohol that is distilled off enter the condenser 18 and, after condensation, leave the apparatus through the pipe 19. Owing to the action of the dehydrating salts in the column D, the result is obtained that all the high boiling point impurities, especially fusel oils, which otherwise, in the case of a large water content in the spirit, especially in the case of alcohol concentrations of below 90% could, mixed with water vapor, pass into the head products or, on distillation, contaminate the alcohol being distilled off, go into the residue according to their boiling point in the condition in which they are poor in, or free from, water, and can be drawn off, together with the aqueous salt solution and small quantities of alcohol remaining therein, through the pipe 20. In the small column E, further use is made of this behavior of the fusel oils, that are poor in water, for the purpose of completely separating them from the last traces of alcohol. This column E sends the last traces of spirit back into the column D through the pipe 21, whilst the high-percentage fusel oils are drawn off at a suitable height in the condition of vapor and passed through the pipe 22 to the condenser 23. From the body of the still of the column E, the completely de-alcoholized aqueous salt solution flows through the pipe 24 to the liquid-raising pump 12 already mentioned.

By means of the mode of operation described, it is possible to produce pure absolute alcohol directly from a mash or other alcohol-containing initial material in one operation and in a continuous process with a consumption of steam that is substantially smaller than that which has hitherto been necessary for the production of pure alcohol (94% by weight) that still contained water.

From the above description it is apparent that the process of purifying and simultaneously completely dehydrating spirits directly from mashes, worts or fermented sulphite liquors can be continuously carried out by dealcoholizing the mashes etc., then separating the first runnings and partially concentrating the same and thereafter purifying and finally concentrating the alcohol in a dehydrating plant. Or it is also within the purview of the invention to continuously separate off a first running, then dealcoholize the residue from the first running and then concentrate the alcohol vapors. Thereafter the alcohol may be purified and dehydrated, by means of a dehydrating medium dissolved in absolute alcohol. Then the pure non-aqueous alcohol is collected and cooled and the dehydrating medium is also collected together with the higher boiling impurities. The latter is dealcoholized so that the fusel oil together with the remaining traces of alcohol in the dehydrating medium are driven off and the alcohol obtained is returned to the process.

What I claim is:—

1. Apparatus for obtaining anhydrous alcohol continuously from mashes, worts or spent sulphite liquors by distillation followed by dehydration, comprising in series communication a distillation column in which the concentration of the ethyl alcohol in the raw material is raised to from 60 to 90 per cent by weight, a second column into which the head product of the first column is passed and from which acetaldehyde, ethyl acetate and similar readily volatile impurities are driven off, a dehydrating column and means to pass vapors from the second column to the dehydrating column in counter-current to an alcoholic solution of dehydrating agent, means for condensing the purified and dehydrated alcohol vapour passing out at the top of the dehydrating column, means for subjecting the liquor withdrawn from the foot of the dehydrating column to a de-alcoholizing action whereby the aqueous dehydrating agent is freed from remaining alcohol which is returned to the dehydrating column and from fusel oil which is collected separately, and means for heating the dehydrating agent to anhydrous form, dissolving it in absolute alcohol, and returning it to the dehydrating column.

2. Apparatus according to claim 1, including means inserted between the second distillation column and the dehydrating column to eliminate traces of impurities deleterious to the anhydrous alcohol eventually obtained.

ADOLF GORHAN.